United States Patent
Viet

(12) 
(10) Patent No.: US 6,463,147 B1
(45) Date of Patent: Oct. 8, 2002

(54) AUTOMATED DIRECTORY LOOK-UP OVER MULTIPLE SWITCHING SYSTEMS

(75) Inventor: Richard L. Viet, Highlands Ranch, CO (US)

(73) Assignee: Avaya Technology Corp., Bashin Ridge, NJ (US)

(*) Notice: Subject to any disclaimer, the term of this patent is extended or adjusted under 35 U.S.C. 154(b) by 0 days.

(21) Appl. No.: 09/299,545

(22) Filed: Apr. 26, 1999

(51) Int. Cl.[7] .......................... H04M 7/00; H04M 3/00; H04M 11/00; H04M 3/42; H04M 1/56

(52) U.S. Cl. .................... 379/219; 379/260; 379/93.01; 379/213.01; 379/142.17

(58) Field of Search ............................. 379/213, 88.16, 379/142.17, 88.01, 260, 93.01

(56) References Cited

U.S. PATENT DOCUMENTS

| | | | | |
|---|---|---|---|---|
| 4,734,931 A | * | 3/1988 | Bourg et al. ............. | 379/93.01 |
| 4,924,496 A | * | 5/1990 | Figa et al. ............. | 379/142.17 |
| 5,052,038 A | * | 9/1991 | Shepard ................... | 379/88.16 |
| 5,638,425 A | * | 6/1997 | Meador, III et al. ..... | 379/86.01 |
| 5,940,493 A | * | 8/1999 | Desai et al. ................ | 379/260 |

* cited by examiner

Primary Examiner—Ahmad F. Matar
Assistant Examiner—Thjuan P Knowlin
(74) Attorney, Agent, or Firm—Patton Boggs LLP

(57) ABSTRACT

A system for providing automated directory look-up over multiple switching systems in a network. Multiple switching systems are connected in a network. When a first switching system receives a request for a directory look-up, the first switching system generates a message requesting a directory look-up on each of the other switching systems. The messages is then transmitted to each of the other switching systems. The other switching systems receive the request and perform a look-up for matches to an input string. Response messages containing all of the matches are then transmitted back to the first switching systems. It is then determined whether a match for the desired name was found and the call is completed.

30 Claims, 5 Drawing Sheets

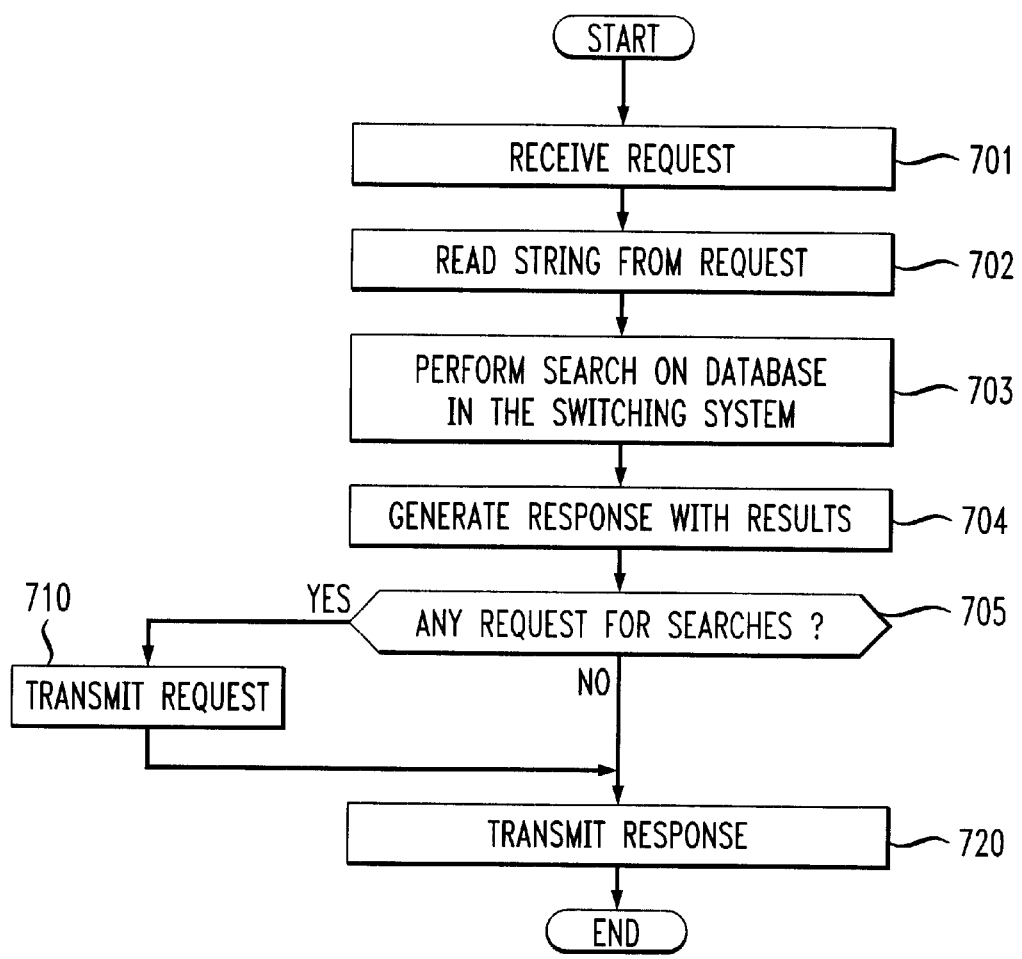

AUTOMATED DIRECTORY LOOK-UP OVER MULTIPLE SWITCHING SYSTEMS

FIELD OF THE INVENTION

This invention relates to telephone switching systems. More particularly, this invention relates to a plurality of interconnected PBX switching systems. Still more particularly, this invention relates to a system for providing automated directory look-up over the plurality of interconnected PBX switching systems to find a telephone number for a desired name.

Problem

It is common to use Personal Branch exchange (PBX) switching systems to provide telephone services for businesses, dormitories, and other facilities that may have a need for many telephone lines. PBX switching systems allow a business or other place to provide many telephone services to connected telephone sets including but not limited to automated answering, call forwarding, voice mail, and directory look-up. Furthermore, the business may configure their telephone network in any way that the facility desires.

Sometimes a facility may be so large that multiple PBX switching systems are needed to provide telephone service to all of the telephone sets needed in the facility. The use of multiple PBX switching systems causes problems in providing some telephone services. One such telephone service that is problematic when multiple PBX switching systems are used is automated directory look-up.

Automated directory look-up is a problem because each PBX switching system only maintains a record of the telephone numbers assigned to telephone sets connected to the switching system. There is no way for a first switching system to determine whether there is a telephone number associated with a name that is serviced by a second switching system. Therefore there is currently no way to provide automated directory look-up for a business or other facility that is serviced by multiple PBX switching Systems.

Solution

The above and other problems are solved and an advance in the art is made by the provision of a system that provides automated directory look-up for a network having multiple switching systems. The present invention allows a calling party that is connected to a first switching system perform an automated directory look-up for a desired name on every switching system in the network. Therefore, a calling party does not have to be connected to the same switching system as a called party to perform a look-up or the telephone number of the called party.

In order to provide automated directory look-up over multiple switching systems, there must be a dedicated Data channel (D-channel) connecting the switching systems in a network. The D-channel is a frequency band or a time division in a frequency band that is transmitted over a dedicated path connecting the switching systems to transmit information between switching systems controllers. Messages are transmitted over the D-channel in a protocol, such as ISDN PRI, which the switching system uses to communicate.

In order to provide automated directory look-up over multiple switching systems in a network, the following process is performed. A request is received by a first switching system for an automated directory look-up. The first switching system then transmits a display or voice message to the telephone set of the calling party, prompting the calling party to input a string of characters representing at least one letter in a name to be found. In the most common embodiment, the characters will be digits that are dialed by the called party where each digit may represent more than one letter of the alphabet.

The first switching system then performs a search for matches to the string of characters in a database of telephone numbers and corresponding names maintained by the first switching system. The first switching system also generates a message requesting a directory look-up from the other switching systems. The request message also includes the string of characters. The request message is transmitted to the other switching systems in the network.

The other switching systems receive the request and perform the following process. First, the other switching systems read the string from the request message. The other switching systems then search for matches in their respective databases of telephone numbers. Each switching systems then generates messages containing the matches. A determination is then made whether or not the switching system has a directory request of its own. If the switching system does have a directory look-up request, the request is transmitted first. The response messages containing matches are then transmitted.

The first switching system receives all of the response messages containing matches from the other switching system. The first switching system maintains a list of all the switching systems that transmit responses with matches. All of the matches are then sorted into some order. Most commonly, this order is alphabetical. The first name is then displayed to the user over a display, such as a Liquid Crystal Display (LCD), in the telephone set or by a voice recording. The user may then determine whether the displayed name is the desired name or scroll through the list of names to find the desired name. If the name is not found, the user may be prompted for additional characters. The additional characters are appended to the end of the string and the process is repeated. In order to reduce traffic over the D-channel, the first switching system may track which other switching systems transmitted matches back to the first switching system and then transmit requests to only those switching systems that transmitted matches.

DESCRIPTION OF THE DRAWINGS

The above and other features of the present invention can be understood from the detailed description given below and the following drawings:

FIG. 7 illustrating a flow chart of a process executed by the other switching systems to respond to a search request from the first switching system.

DETAILED DESCRIPTION

Figure 1:
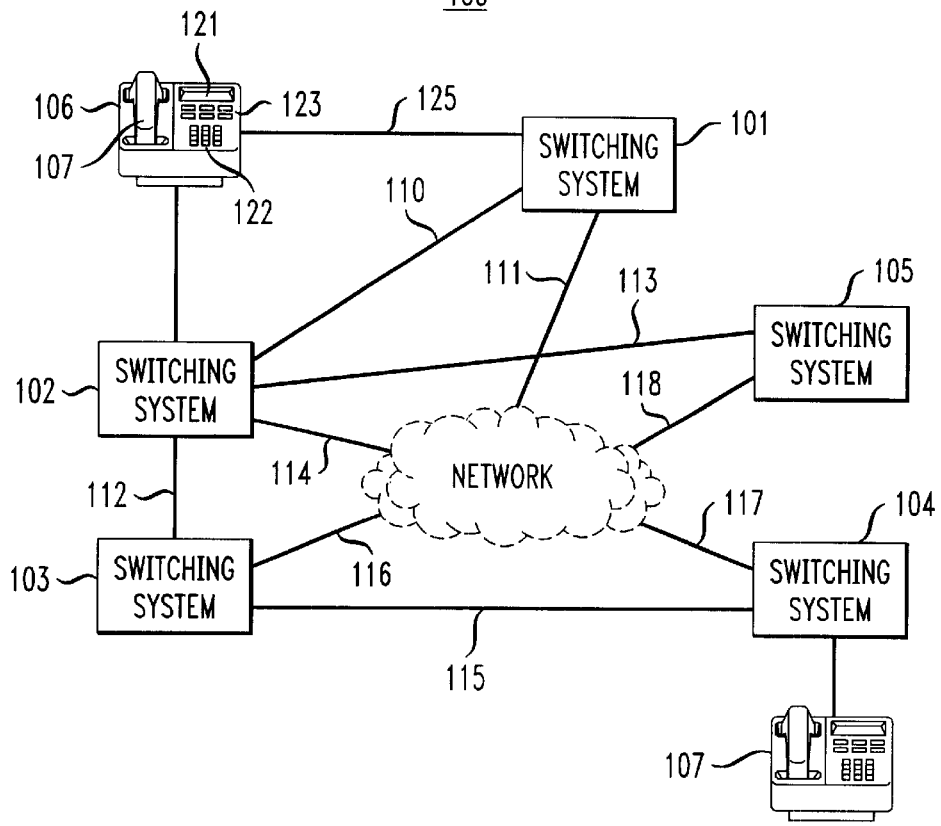
FIG. 1 illustrating a network of switching systems that implement the directory look-up system of the present invention.

Physical Layout of a Telephone System—FIG. 1.

FIG. 1 illustrates a physical layout of a network 100 of multiple switching systems 101–105 that provide telephone service to many telephone interfaces 106–107 connected to the switching systems 101–105. In a preferred embodiment, switching systems 101–105 are Definity G3 PBX switches produced by Lucent Technologies of Holmdel, N.J. Those skilled in the art will appreciate that the concepts and processes of the present invention may be applied to any type of switching system or a network having several different types of switching systems.

Each switching system 101–105 is connected to the other switching system by permanent communication lines 110–118. Permanent communication lines 110–118 are dedicated physical connections between the switches. In the preferred exemplary embodiment, switching system 101 is connected to switching system 102 via path 110 and to other switches in the network via path 111; switching system 102 is connected to switching system 103 via communication line 112, to switching system 105 via path 113, and to other switching systems in the network via path 114; switching system 103 is connected to switching system 104 via communication line 115 and other switching systems in the network via path 116; switching system 104 is connected to other systems in the network via path 117; and switching system 105 is connected to other switching system in the network via path 118. One skilled in the art will recognize that there are numerous configurations for connecting switching systems 101–105 that can be used to connect the switching systems in order to reduce the number of connections to switching system in each switching system. The switching systems transmit information and commands regarding call set-up, maintenance, other services via a Data channel (D-channel) over the dedicated connection between the switching systems 101–1 05 using a standard ISDN protocol, such as ISDN PRI.

Telephone interfaces 106 and 107 are devices capable of telephonic communication that can receive and transmit telephonic communications over network 100. Telephone interfaces 106 and 107 can include but are not limited to telephone sets, computer systems, and fax machines. In the preferred embodiment, telephone interfaces 106 and 107 are telephone sets capable of transmitting and receiving out of band signals, such a 8410-D telephone set produced by Lucent Technologies of Holmdel, N.J. Telephone interfaces 106 and 107 have receiver 120 for voice communication by a user, display 121 for displaying information to a user, digit buttons 122 for input ten digits which are conveyed as signals in the voice band of a telephone, and buttons 123 which are inputs for out of band signals to switching system. Those skilled in the art will recognize that although telephone interfaces 106 and 107 are illustrated on separate switches that the present invention will work for telephone interfaces connected to the same switching system or when one of the telephone interfaces 106 is connected to a switching system 105 in network 100 from an outside line.

Figure 2:
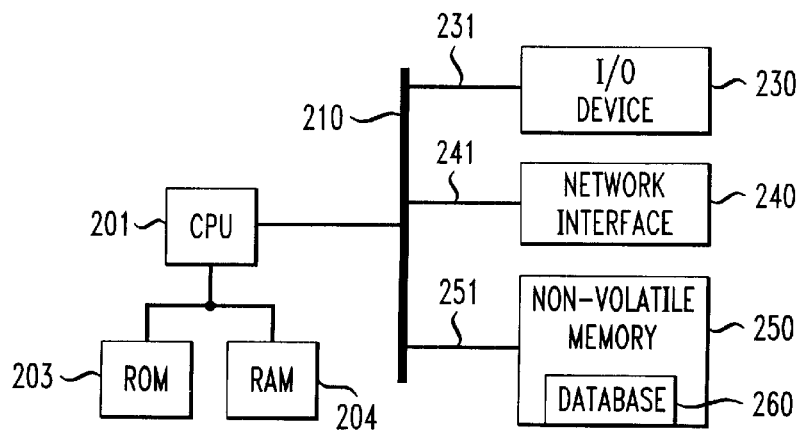
FIG. 2 illustrating a controller inside a switching system.

Controller in a Switching System 101–105—FIG. 2.

FIG. 2 illustrates controller 150. Controller 150 is the processing system that executes instructions which control the hardware components of switching systems 101–105 to provide telephone services to telephone interfaces 106 and 107. The telephone services provided include the automated directory look-up of the present invention. Controller has a central processing unit (CPU) 201 which executes instructions read from a memory to perform applications that comprise the operations of controller 150. CPU 201 is connected to a memory bus 202. Memory bus 202 allows CPU 201 to access Read Only Memory (ROM) 203 and Random Access Memory 204. ROM 203 is a memory that stores instructions for performing the basic operative tasks of controller 150. RAM 204 is a memory that stores the instructions and data needed to execute applications that are performed by controller 150.

I/O bus 210 connects CPU 201 to a plurality of peripheral devices. CPU 201 receives and transmits data to the peripheral devices via I/O bus 210. The peripheral devices connected to I/O bus 210 include, but are not limited to, input device 230, network interface 240, and nonvolatile memory 250. Input device 230 is connected to I/O bus 210 via path 231 and is a keyboard and/or mouse attached to an appropriate driver for receiving input data from an administrator. Network interface 240 is connected to I/O bus 210 via path 241. Network interface 240 is a device, such as a modem or Ethernet device driver, that allows controller 150 to communicate with a second processing system that may or may not be connected to network 100.

Nonvolatile memory 250 is a device, such as a disk drive, connected to I/O bus 210 via path 251 and which can read and write data to a disk or other storage media to store the data for future use. A phone number database 260 is maintained by controller 150 in memory 250. Phone number database 260 is a database that contains a telephone number or extension that is associated with an individual user. For example, the extension or telephone number may be the telephone number for the telephone in a person's office. Each record in database 260 contains at least a first field for a name and a second field for a telephone number. Any other information maintained in this database is not pertinent to this invention and is omitted for clarity and brevity.

Figure 3:
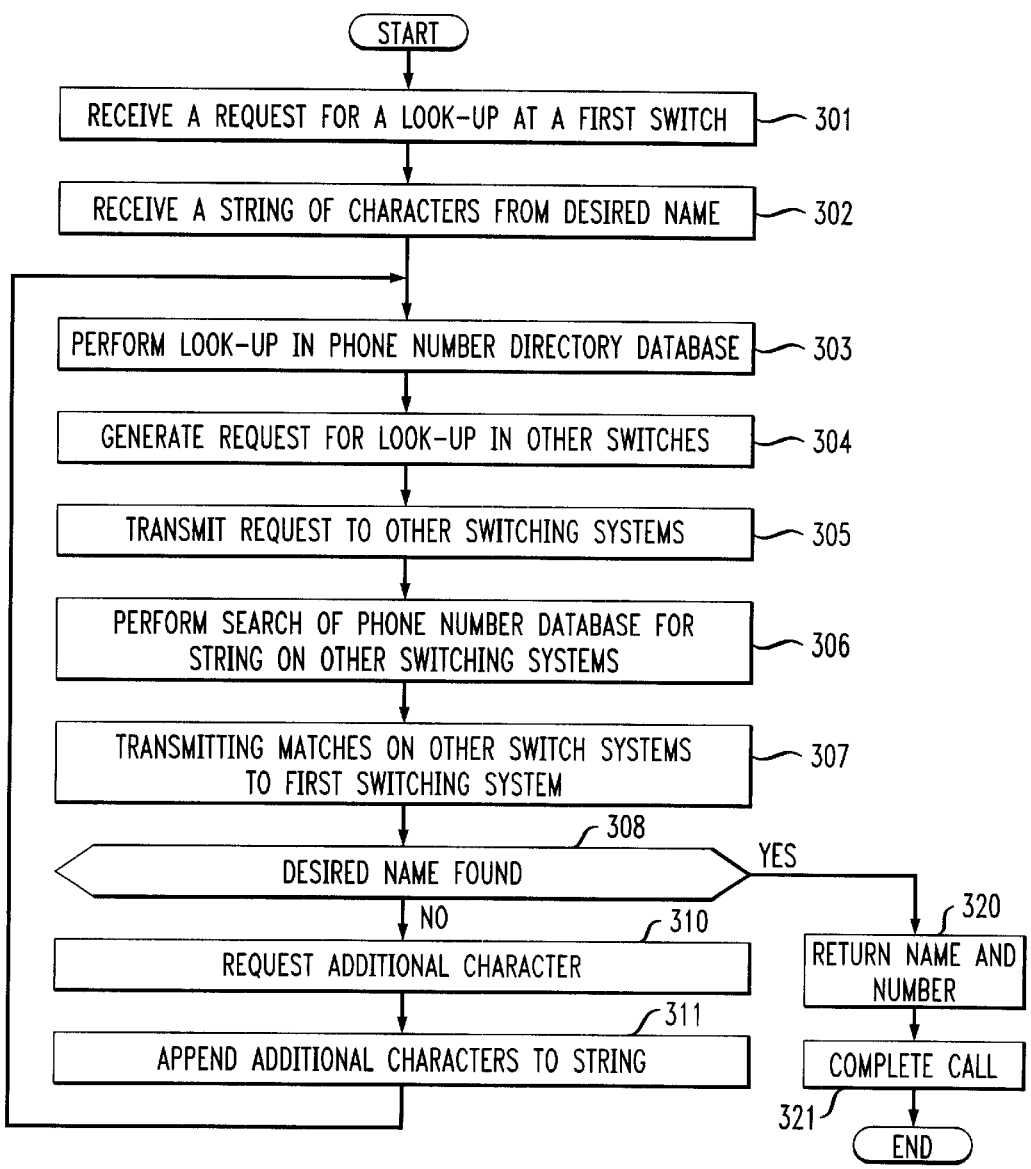
FIG. 3 illustrating a flow chart of a method for providing automated directory look-up over a plurality of switching system.

Overview of Method for Providing Automated Directory Look-up—FIG. 3.

FIG. 3 illustrates the method 300 for providing automated directory look-up over multiple switching systems 101–105 in a network 100. Automated directory look-up allows a user to perform an automated directory look-up for a name with a corresponding telephone number that receives service from one of the switching systems in the network. Method 300 allows the request for a directory look-up to be handled by any switching system 101–105 in the network instead of requiring the call to be handled by the switching system that provides service to the user. All messages transmitted between switching systems 101–105 are in a standard protocol such as ISDN PRI. It should be noted, it is expected that those skilled in the art may read the specification for a particular switching system and should be able to program the switching system in the manner below to provide method 300.

Method 300 begins in step 301 with a first switching system 101 receiving a signal indicating a request for a directory look-up from a telephone interface 106. In a preferred embodiment of the present invention, the signal for a request is an out of band signal received over a D-channel and path 125 in response to a button 123 being depressed. However, those skilled in the art will recognize that the signal may also be signals carried in the voice band that are representative of a sequence of digits entered on the telephone.

In step 302, a string of characters representing at least a portion of the desired name to look-up is received by the first switching system 101. A preferred exemplary embodiment of a process executed by first switching system 101 is given in process 400 illustrated in FIG. 4. Also, in the preferred embodiment, the string of characters is dialed digits received by first switching system 101. Each digit received may represent one of a plurality of letters. For example, 2 represents a, b, and c; and 3 represents d, e, and f. However, it may also be possible to use a specific number sequence to represent each letter. This is a design choice left to those skilled in the art.

In step 303, first switching system 101 performs a search in the phone number database 260 maintained in switching system 101 for possible matches to the input string of characters. This is a simple character matching routine that is common and well known in the art which is not described in detail here for brevity and clarity of the detailed description.

In step 304, a look-up request message is generated for transmission to the other switching systems 102–105. The request message is part of a message packet generated in the ISDN protocol and contains the string of characters to be matched. The request message is then transmitted to other switching systems 102–105 in step 305.

In step 306, the other switching 102–105 receive the request message transmitted in step 305 and perform a search for matches to the string of characters in the phone number database 260 maintained by controller 150 of the switching system. The search is completed by reading the string of characters from the request message and performing the same search routine that is performed for a directory look-up routine on the switching system.

In step 307, the other switching systems 102–105, place all the matches to the string of characters found in the search into message packets and transmit the message packets to the first switching system 101. The message packets are generated in the ISDN protocol and transmitted over the dedicated D-channel between switching systems. It is then determined if a match to the desired name was found by the searches in step 308.

If the desired name was found in step 308, the name and number are returned to the user in step 320. The name and number may be transmitted to LCD display 121 over a D channel or maybe an automated voice message giving the name and number transmitted over the voice channel and played over receiver 120. A call can then be completed over network 100 to the telephone interface 106 having the returned telephone number in step 321 and method 300 ends.

If the name is not matched or there are too many matches of the character string, the user is requested to input additional characters in step 310. In step 311, the additional characters are appended to the string of characters and method 300 is repeated from step 303 in order to find a match. The processes below include optimizations that will decrease the traffic over the D-channel and reduce the number of iterations of the method 300.

Figure 4:
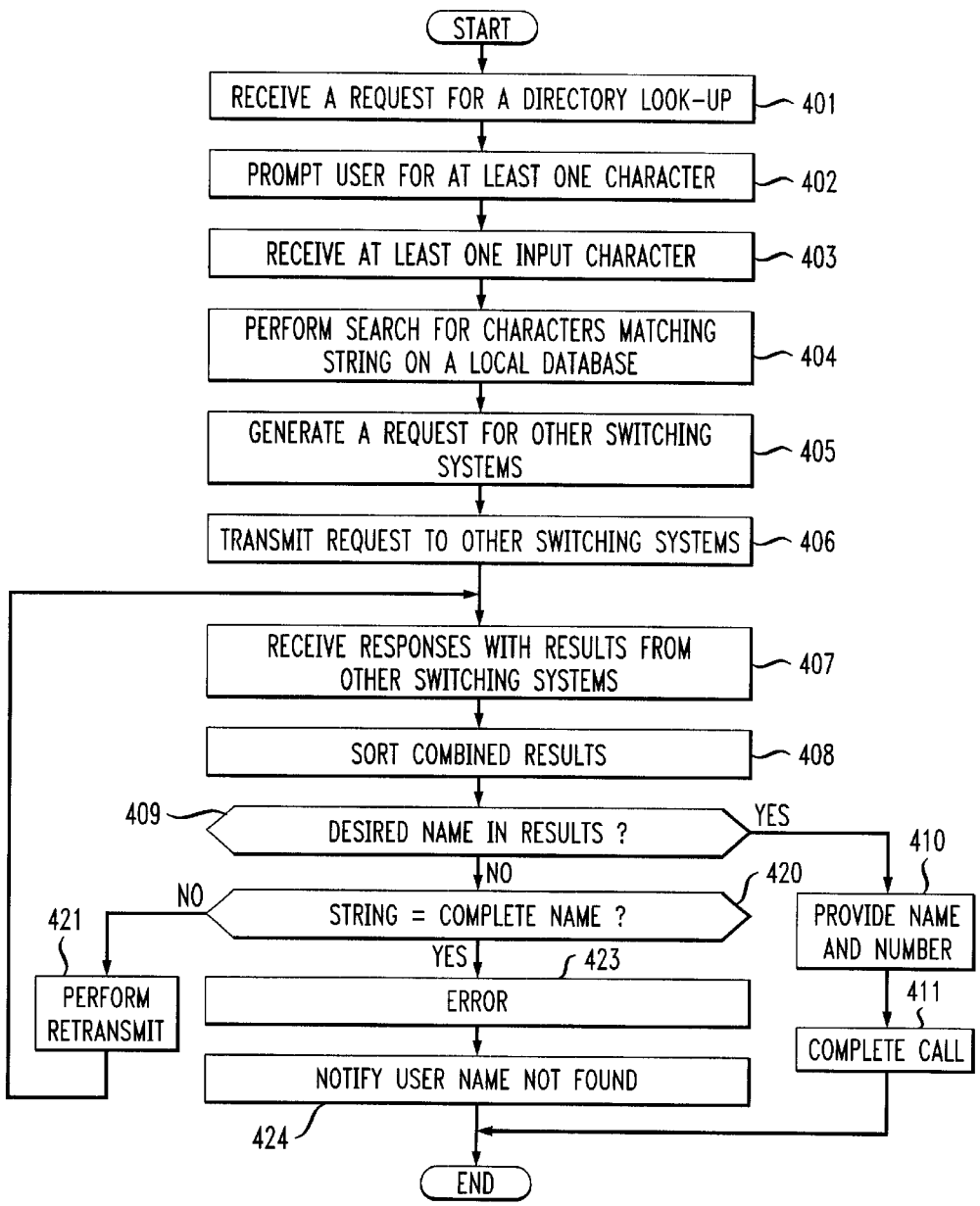
FIG. 4 illustrating a flow chart of a process executed by a first switching system that receives a request for a directory look-up.

Process executed by a first switch 101 to provide Automated Directory Look-up Over Multiple Switching Systems—FIG. 4.

Process 400 illustrated in FIG. 4 is the instructions that are stored in a first switching system 101 that are executed to provide a directory look-up over multiple switching systems 101–105 in a network 100. One skilled in the art will recognize that each switching system in a network will contain these instructions in order to provide this service to each call handled by the switching systems 101–105 in the network 100. One skilled in the art is also expected to be able to program controller 150 in the switching systems 101–105 in network 100 to store instructions to perform these operational steps.

Process 400 begins in step 401 with first switching system 101 receiving a request for a directory look-up from telephone interface 106. As noted above, this request may be a signal received over D-channel that is generated in response to a button being depressed on telephone interface 106 in a preferred exemplary embodiment. In optional step 402, the first switching system then prompts the user for a string of characters. In a preferred exemplary embodiment, this prompt may be completed by transmitted signals over a D-channel that cause display 121 to display a request for a user to input digits. Alternatively, any other type of prompt may be used, including but not limited to a recorded voice prompt.

In step 403, a string of at least one character is received from telephone interface 106. The character may be a digit that represents a plurality of letters, a series of digits that represent a letter, or letter. It is left as a design choice based upon the system used and specifications of the network. A string represents at least a portion of the desired name to look-up. For example, the desired name is Smith and the user inputs the character 7 which represents p, q, r, and s in a preferred exemplary embodiment. In the preferred exemplary embodiment, only one digit at a time is received. However, one skilled in the art will recognize that any number of characters may be input at any given time and it is left as a design choice.

In step 404, a search for names matching the string is performed on a phone number database maintained by the first switching system 101. This is a conventional directory look-up. All names matching the character are returned. For example, all names beginning with p, q, r, s would be returned for the digit 7 in the preferred exemplary embodiment.

In step 405, a search request for the other switching systems 102–105 is generated by first switching system 101. The request is generated in a protocol used for communication between the switching systems over a Data-channel dedicated to communication between the switching systems (101–105). The request includes the string of characters that represent at least a portion of the desired name. The search request is then transmitted to the other switching systems 102–105 in step 406.

The first switching system 101 then waits and receives responses to the request in step 407. The results include all of the matches found in directory look-up search on the other phone number databases maintained on the other switching systems 102–105. The responses are received in the protocol that the switching systems 101–105 use to communicate.

The matches found in the search by the first switching system 101 and matches received from the other switching systems 102–105 are then sorted into a desired order in step 408. One such order is alphabetical order. It is then determined whether the desired name is in the results in step 409. This may be a simple test such as transmitting a voice recording containing a name or a video display of the name to telephone interface 105 and determining whether the name matches the desired name. Alternatively, the user may be allowed to scroll through the returned names by transmitting signals to first switching system 101.

If the desired name is matched in step 409, the desired name and number are provided to the user in step 410 and the call is completed to the phone number of the desired name in step 411. A conventional call set-up is used to complete the call.

If the desired name is not matched in step 409 or the number of matches is too great, it is then determined whether the string used in the search represents the entire name in step 420. This may be done by determining is a termination character such as a star (*) or a pound sign (#) have been input into the character string. If the string does not represent a complete name, a re-transmit updated search routine is performed in step 421. The retransmit is performed is described below in FIG. 6. If the entire name has been entered, an error message is generated in step 423 and a transmission is transmitted to telephone interface 106 indicating that a match was not found in step 424.

Figure 5:
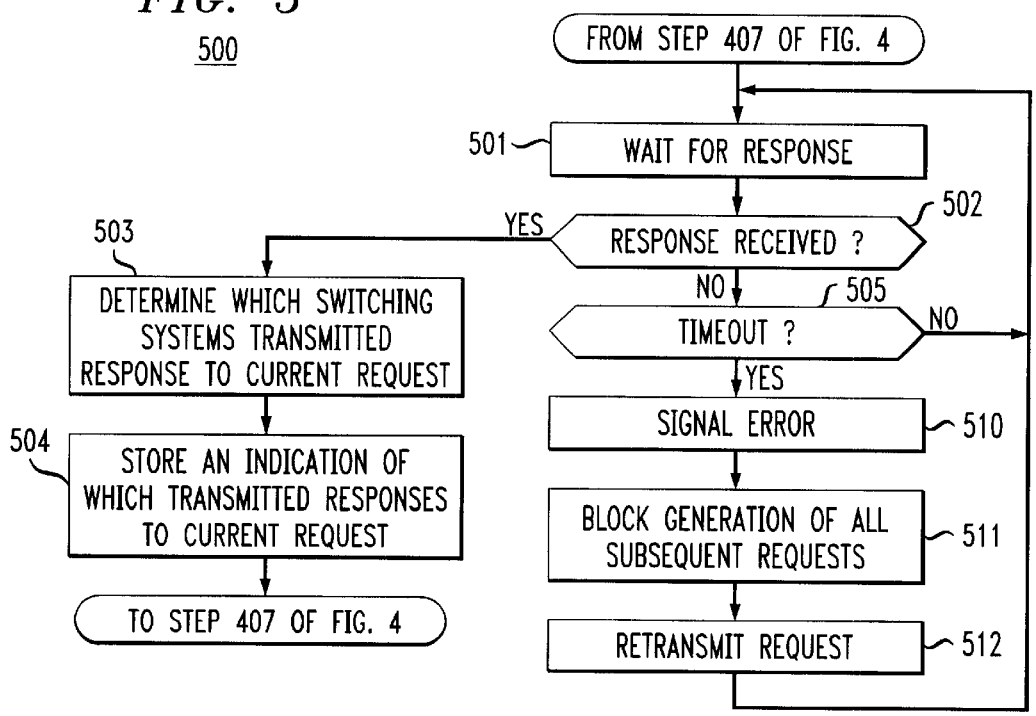
FIG. 5 illustrating a flowchart of a sub-process executed by the first switching system to receive results from other switching systems.

Process for Receiving Results From Other Switching Systems—FIG. 5.

FIG. 5 illustrates process 500 which is performed by first switching system when receiving results of searches by other switching systems 102–105. Process 500 tracks the switching systems that return matches for use in re-transmitting updated searches and determines when a search is taking too much time to reduce the amount traffic over the D-channel. It should be noted that this a preferred exemplary process and that implementation of all of these steps is optional.

Process 500 begins in step 501 with switching system 101 waiting for responses from other switching systems 102–105. In step 502, switching system 101 determines whether at least one response is received. If at least one response is received, switching system 101 determines which switching systems 102–105 have transmitted responses with matches in step 503. A buffer containing a list of switching systems 102–105 that have transmitted matches is stored in step 504. The storing in step 504 may be as simple as storing a flag in the buffer indicating a match was sent to the last search. After step 504, process 500 ends.

If no responses are received in a specified amount of time in step 502, it is determined whether a time-out period has elapsed in step 505. The time out period is the amount of time that switching system 101 will wait for a response before determining that there is too much traffic over the D-channel to complete the request. If the time-out period has not elapsed, process 500 is repeated from step 501. If the time-out period has elapsed, an error signal is generated in step 510. The error signal may also be indicated to the user over telephone interface 106. In step 511, all further requests for searches are blocked. The blocking of requests will eliminate the traffic over the D-channel. The original signal is then re-transmitted in step 512.

Figure 6:
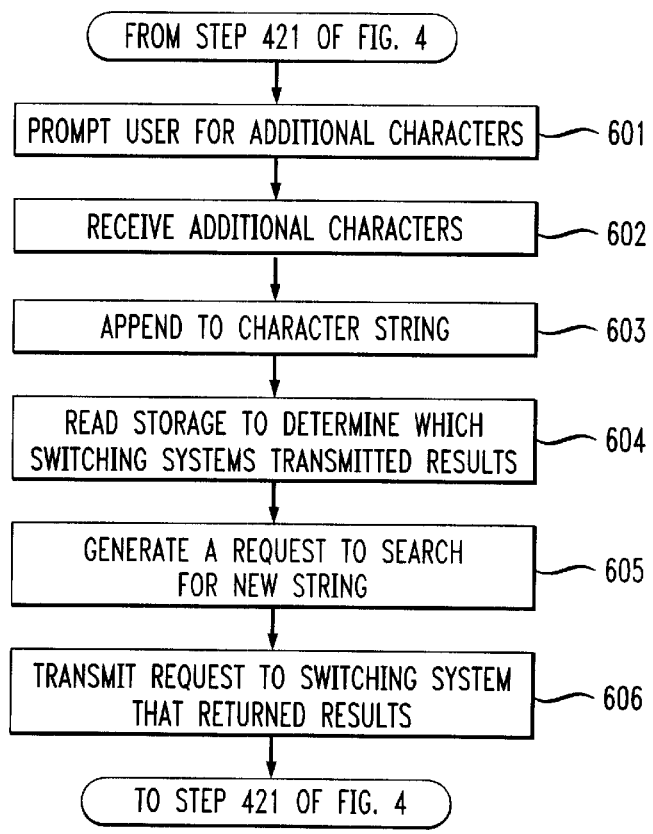
FIG. 6 illustrating a flow chart of a sub-process executed by the first switching system to transmit subsequent search requests to the other switching systems.

Process for Re-transmitting Updated Searches—FIG. 6.

FIG. 6 illustrates process 600 for re-transmitting requests with updated searches. This process is performed when the desired name is not found by the user and more characters remain in the desired name. Process 600 may be used to reduce traffic over the D-channel by only requesting additional updated searches from those switching systems that returned matches. It should be noted an alternative process 600 could be used if switching system 101 stored all matches to the first search. In which case, process 600 would simply reduce the number of matches from the stored matches in a sort routine.

Process 600 begins in step 601 with the user being prompted for additional characters. This is done by switching system 101 providing a voice or display prompt to telephone interface 106. In step 602, a string of additional characters is received. As noted above, this string can be of any number of characters and it is left as a design choice. The string of additional characters is then appended to the string of characters representing the desired name in step 603.

In step 604, a memory containing indications of which switching systems transmitted responses having matches is read. A new request with the new character string is generated in step 605. The new request is then transmitted to the switching systems that responded with matches in step 606 and process 600 ends.

Process for Receiving Requests and Transmitting Responses—FIG. 7.

FIG. 7 illustrates a process 700 executed by other switching systems 102–105 to respond to a request from first switching system 101. Process 700 is performed to establish a priority of messages to be transmitted by switching systems 102–105. The priority of messages allows the shorter messages containing requests for searches to be transmitted before messages having for responses to search requests. This is because the number of requests transmitted is significantly less than the number of requests and searches responding to requests take longer than the time needed to transmit results over the network. Therefore, transmitting requests prior to responses increases the efficiency of communications over network 100.

Process 700 begins in step 701 when a request is received from first switching system 101. The string of characters is read from the request in step 702 and a search of the phone number database for matches to the string is performed in step 703. The search is the same a search performed in a conventional directory look-up search. A response is then generated in step 704. The response generated may be series of messages with each message containing at least one match. The number of matches that are sent may also be limited. The limiting of the number of matches transmitted is a design choice that may be modified depending on the amount of traffic over the D-channel.

In step 705, it is determined whether the switching system 102–105 has a request for a search to be sent. If there is no request to send, the messages containing the response are transmitted in step 720. Otherwise, all requests are transmitted first in step 710 and then the requests are transmitted in step 720. Process 700 ends after step 720.

The above description is of a system for providing an automated directory look-up over a plurality of connected switching systems. It is expected that those skilled in the art can and will design systems that infringe this invention as set forth in the following claims either literally or through the Doctrine of Equivalents.

What is claimed is:

1. A method for concurrently performing a directory look-up service on a plurality of interconnected switching systems, each of which includes a directory look-up capability, comprising the steps of:

receiving a request for a directory look-up at a first switching system from a telephone interface served by said first switching system;

receiving a string of characters from said telephone interface corresponding to at least a portion of a desired name to be found by said directory look-up service;

transmitting said string of characters to at least one other one of said plurality of interconnected switching systems;

concurrently performing a search for a match between said string of characters and a name in a database storing telephone numbers and corresponding names in each of said first switching system and said at least one other one of said plurality of interconnected switching systems;

returning matches found in said search of said database in said at least one other one of said plurality of interconnected switching systems to said first switching system; and determining whether said matches contain said desired name.

2. The method of claim 1 further comprising the step of:
completing, in response to one of said matches containing said desired name, a call from said telephone interface to a second telephone interface using a telephone number corresponding to said desired name.

3. The method of claim 1 further comprising the step of:
displaying a telephone number corresponding to said desired name in response to a determination that said results contain said desired name.

4. The method of claim 1 further comprising:
prompting a user for at least one character in said desired name in response to receiving said request containing a portion of a desired name.

5. The method of claim 4 further comprising the step of:
prompting said user for a subsequent character in said desired name in response to a determination said results do not contain said desired name.

6. The method of claim 5 further comprising:
performing a search for said string of characters on said first switching system and said at least one other one of said plurality of interconnected switching systems in response to receiving said subsequent character.

7. The method of claim 6 further comprising the step of:
combining said results of said search on said first switching system and said at least one other one of said plurality of interconnected switching systems.

8. The method of claim 7 further comprising the step of:
determining which of said first switching system and said at least one other one of said plurality of interconnected switching systems contain said desired name in response to a determination that said results contain said desired name.

9. The method of claim 8 wherein said step of determining comprises the steps of:
sorting said results into alphabetical order;
sequentially displaying a name corresponding to each of said stored results to said user; and
receiving a response from said user indicating a one of said displayed names matches said desired name.

10. The method of claim 9 further comprising the steps:
appending a subsequent character to said string of characters in response to a determination said displayed names do not match said desired name.

11. The method of claim 1 further comprising the step of:
storing an indication that said at least one other one of said plurality of interconnected switching systems returned a results to said receiving of said string of characters.

12. The method of claim 11 further comprising the step of:
reading a buffer containing said indication in response to receiving a subsequent character; and
transmitting a subsequent string of characters containing said subsequent character to said at least one other one of said plurality of interconnected switching systems in response to a determination said buffer contains said indication.

13. A system for providing a directory look-up function over a plurality of switching systems that are connected to a first switching system comprising:
means for receiving a request at said first switching system for a directory look-up from a telephone interface,
means for receiving at said first switching system at least one character from a desired name to be looked up from said telephone interface, means for transmitting from said first switching system a request to said plurality of switching systems to perform a search on a phone number database maintained in each of said plurality of switching systems for names matching said string of at least one character,
means for receiving at said first switching system matches to said string from said plurality of switching systems, and
means for determining whether said desired name is in said matches.

14. The system of claim 13 wherein each of said characters in said string of characters are digits and each of said digits represents a plurality of letters.

15. The system of claim 13 further comprising:
means for generating a request, containing said string of characters, to send to said plurality of switching systems.

16. The system of claim 13 further comprising:
means for completing a call to a telephone number corresponding to said desired name matched by said character string in response to a determination said desired name was matched in said search.

17. The system of claim 13 further comprising:
means for prompting said user for at least one character in response to receiving said request for said directory look-up.

18. The system of claim 13 further comprising:
means for performing a search of said phone number database managed by said first switching system in response to receiving said string of characters.

19. The system of claim 13 further comprising:
means for maintaining a record of which of said plurality of switching systems returned matches to said string.

20. The system of claim 19 further comprising:
means for sorting said matches from said first switching system and said plurality of switching systems into an ordered list.

21. The system of claim 19 further comprising:
means for sorting said matches from said first switching system and said plurality of switching systems into an alphabetically ordered list.

22. The system of claim 20 wherein said means for determining whether said desired name is in said matches comprises:
means for displaying a name in said ordered list, and
means for receiving an indication from said telephone interface whether said name is said desired name.

23. The system of claim 22 further comprising:
means for performing a re-transmit routine in response to a determination that said desired name is not in said results.

24. The system of claim 23 wherein said means for performing said re-transmit routine comprises:
means for receiving additional characters from said telephone interface,
means for appending said additional characters to said string of characters,
means for transmitting a subsequent request to said plurality of switching systems for a search of said databases using said string of characters with said additional characters.

25. The system of claim 24 further comprising:

means for reading said records to determine which of said plurality of switching systems transmitted matches, and transmitting said subsequent request to only each of said plurality of switching systems that transmitted matches.

26. The system of claim 13 further comprising:

means for generating an error signal in response to determination that said desired name does not match said names matched by said string of characters.

27. The system of 25 further comprising:

means for transmitting an indication to said telephone interface that no match was found in response to said error signal.

28. The system of claim 13 wherein said means for receiving matches comprises:

means for waiting for a response for a period of time, means for determining if a response was received during said period of time, means for determining whether a time-out period has expired, and means for generating an error signal if said time-out period has expired.

29. The system of claim 28 wherein said means for receiving said matches further comprises:

means for directing said first switching system to block transmission of subsequent requests for directory look-ups in response to said error signal, and means for transmitting said request after said subsequent requests have been blocked.

30. The system of claim 13 further comprising:

means for receiving said request from said first switching system, means for reading said string of characters from said request, means for performing a search of said phone number database to find names that match said string of characters, means for generating a response with names matching said string of characters, means for determining whether said switching system has a subsequent request for directory look-up, means for transmitting said subsequent request in response to a determination said subsequent request is required, and means for transmitting said response in response to transmitting said request.

* * * * *